May 26, 1931.    R. HERZOG    1,807,209
SPEED REGULATING SYSTEM
Filed April 27, 1928    2 Sheets-Sheet 1
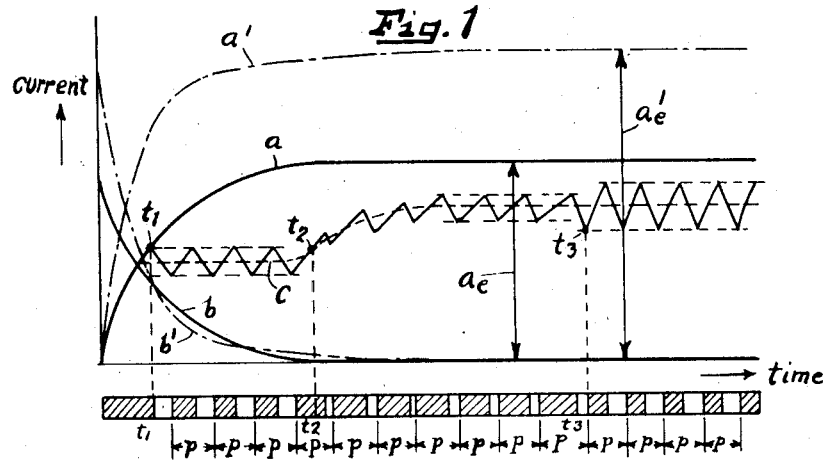
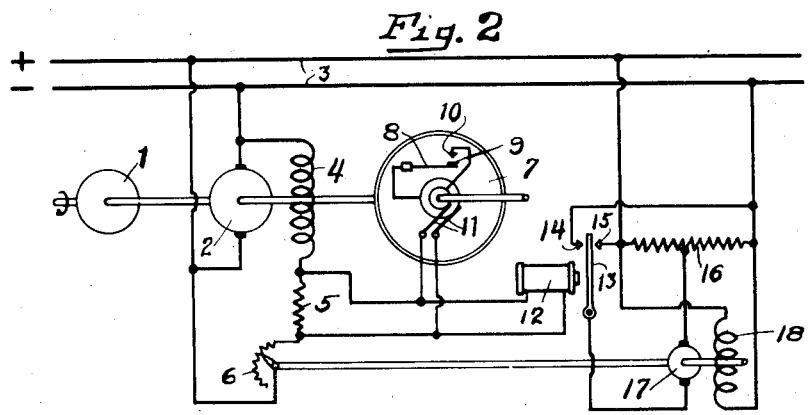
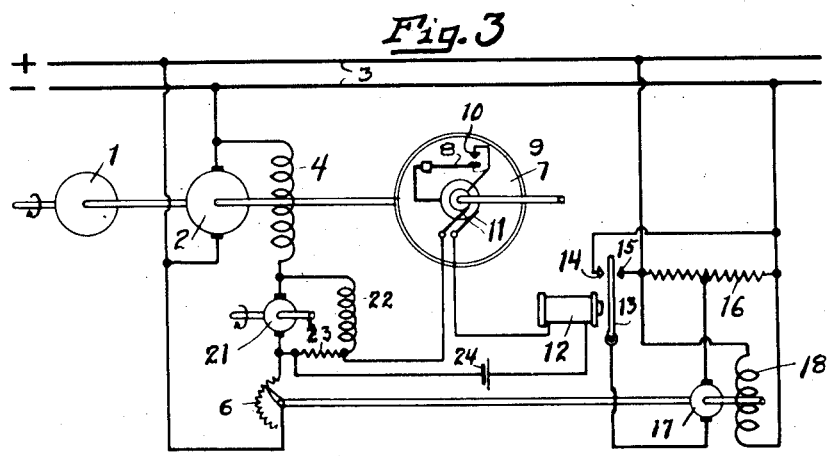
INVENTOR
Robert Herzog
BY Otto Ratz
ATTORNEY Patented May 26, 1931

1,807,209

UNITED STATES PATENT OFFICE

ROBERT HERZOG, OF BERLIN, GERMANY, ASSIGNOR TO C. LORENZ AKTIENGESELL-SCHAFT, OF BERLIN-TEMPELHOF, GERMANY

SPEED REGULATING SYSTEM

Application filed April 27, 1928, Serial No. 273,307, and in Germany May 4, 1927.

This invention relates to regulating devices for keeping constant the speed of rotation of machines, especially of electric machines. The invention is more particularly directed to such regulators, e. g., of the vibrating or Tirrill type which are responsive to slight deviations of the speed from its normal value and which are able to keep the speed constant within a very narrow range of variations.

The object of the present invention is to provide a means by which is secured a precise regulation within wide limits of deviation of speed from its normal value.

Another object of this invention is to automatically adjust a regulator to its proper working conditions, depending on the variations of the speed.

Another object of this invention is to provide a speed responsive device adapted for changing the working characteristics of the regulator in accordance with speed variations in such a way as to maintain the regulation at its most effective and favorable point on the working characteristic at different conditions of loads of the machine to be regulated.

A further object of the invention is to widen the stable working range of a vibrating type speed regulator by means of a servomotor operated in accordance with variations of speed and controlling a resistance placed in a speed influencing circuit.

Still another object of this invention is to enable a vibrating regulator to be employed in connection with prime movers of large power by providing an electrical circuit of small power influenced by the regulator and intended to control the vibrating and the rough regulating mechanisms.

A further object of this invention, when used with large motors, is to provide a separate exciter dynamo and regulate the speed by influencing the field of this exciter.

Finally, with large motors a further object is to provide a separate field circuit for the motor which is controlled by a separate exciter independently of the main field.

The invention is set forth with more clearness by the following detailed disclosure taken with reference to the accompanying drawings, of which Fig. 1 represents a series of theoretical curves illustrating the working principle of a vibrating regulator as employed in accordance with the present invention;

Fig. 2 is a diagram of connections showing one embodiment of the invention in a preferred practical form;

Fig. 3 is a diagram of connections representing an embodiment of the invention in case prime movers of large power are to be regulated;

Similar reference numerals throughout the drawings refer to the same elements.

Figure 4:
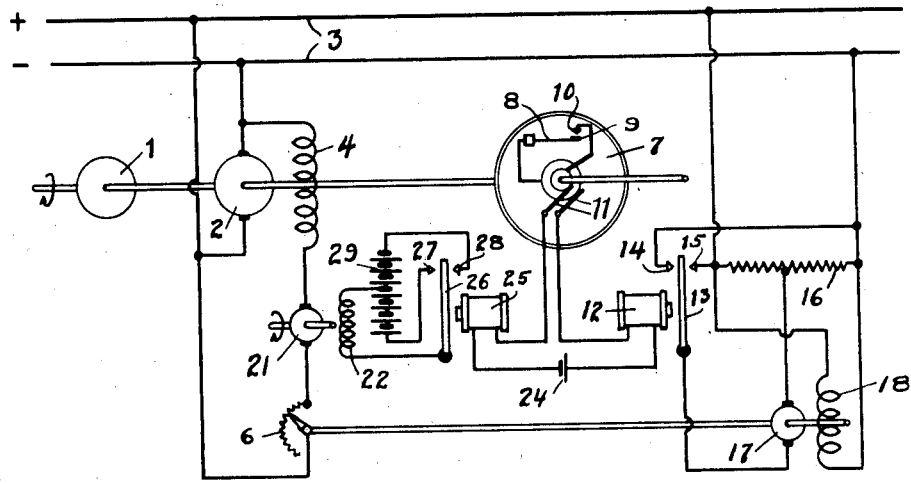
Fig. 4 is a modification of the circuit of Fig. 3 where a separate relay is provided to control the speed influencing means.

High precision speed regulators of the vibrating or Tirrill type have been of great advantage in some arts, e. g., in wireless telegraphy, using high frequency alternators for the generation of high frequency currents. In this case, a very constant frequency of the currents is required which can only be secured by keeping the speed of rotation of the alternator at a very constant value. The essential feature of such vibrating regulators is that a persistent regulating action takes place, i. e., they act even in case the speed has its exact and desired value. Thus, whenever this value of the speed changes by only a slight degree, through some cause, the regulator will not have to start from its position of rest, but will be instantly at its fullest regulating power and may thus act practically instantaneously, without any perceptible time lag due to mechanical or electrical inertia phenomena, tending to restore immediately and maintain the original value of the speed of rotation. An efficient and most simple type of such a regulator is described in the United States Patent 1,647,020, which comprises essentially a disc rotated in a vertical plane by the machine to be regulated. A resilient member arranged on said disc has a contact weight mounted at the point of its largest amplitude of vibration. This contact periodically closes and opens another contact fixed on said disc. This closing takes place once during each revolution for a shorter or longer period depending on the influence of the centrifugal force and the force of gravity acting on said vibrating contact. The contacts open and short-circuit a resistance inserted in an electrical circuit capable of influencing the speed of the machine to be regulated. To each speed there corresponds a distinct relation of contact opening period to contact closing period. Whenever the speed changes, this ratio instantaneously assumes a new value, thus changing the average mean current in the speed influencing circuit in such a way as to maintain the normal speed value.

Referring to Fig. 1 of the drawings, the theoretical operation of a regulator of the type above outlined is here illustrated. It is supposed that the machine to be regulated is a shunt wound direct current electric motor. These machines have proved to be best suited for regulation systems of the type under consideration. A fixed resistance is inserted in the shunt field circuit of the motor besides the usual hand operated variable resistance for changing the speed. When a voltage is applied to the terminals of the shunt circuit, an exciting current will build up in the circuit, whose final value $d_e$ is determined by the effective resistance of the shunt circuit. The current in this circuit increases from zero to its final value, as is well known, according to an exponential curve as shown at $a$ in Fig. 1. The curves in Fig. 1 show the value of the current as a function of time. If, on the other hand, the shunt circuit is opened by opening a switch inserted in this circuit, it will also take a certain time until the current has reached its zero value again. This is represented in Fig. 1 by curve $b$ which is symmetrical to curve $a$. This holds true for every sort of electrical circuit, as is well known.

Assuming now the current to have reached a value on the curve $a$ corresponding to the time marked $t_1$. The motor will then be supposed to have attained a speed at which the above opening and closing operation of the regulator contacts begin to take place. It is, furthermore, assumed that in this state opening and closing periods within one revolution or regulating working period $p$ are alike. Thus, the current in the shunt circuit, as is seen from the figure, will not increase to its final value $a_e$ at all, but will oscillate between two limiting values as the regulating resistance inserted in the shunt circuit is periodically opened and short-circuited by the regulator contacts. These oscillations in the exciting current are very small on account of the comparatively high frequency of the opening and closing operation and will not be perceptible in the speed of rotation which is proportional to the current in the exciting circuit. Therefore, the operation will be represented by an average current, as shown at $c$ in Fig. 1. The closing and opening periods within the regulating periods $p$, are shown in the figure by shaded and blank rectangles below the main figure.

Consider now the case of increasing the speed of the motor (time marked $t_2$ in Fig. 1). As a consequence of the increase the centrifugal force exerted on the oscillating contact will increase and the interval of closing of the contacts within one revolution will increase, whereas the interval of opening will decrease correspondingly. In other words, the ratio of closing period to the opening period of the contacts increases, allowing the mean current $c$ to assume immediately a new, viz., a higher value, as is seen in Fig. 1. This increased exciting current, however, tends to decrease the speed, i. e., the speed is maintained at its original value.

In the case where the speed decreases with respect to its normal value, similar conditions will take place in a reverse sense. It constitutes an essential feature of this method of regulation, that a persistent operation of the regulating mechanism takes place substantially independent of the value the speed possesses. The regulator works in such a manner as to feel continuously whether the speed has its correct value and is thus instantly prepared to exert its regulating action when a tendency occurs to change the speed from its normal value.

However, if the variations of speed are too wide, the contacts will either be closed permanently, or remain open. The first case occurs when the speed increases above an upper limiting value and the second case when the speed decreases below a lower limiting value. These two limiting values define the regulating or stable range, within which a regulating action of the character described above is effected. In order to have the necessary margin of regulation, the normal speed opening period and closing period must be approximately equal, as seen in Fig. 1, so that the operating point of the regulator is in the middle of the regulating range, half way between the limiting values of regulation. Such a state was assumed at first in Fig. 1, after time $t_1$. The condition, however, following the time $t_2$, when the load of the motor or its supply voltage and consequently its speed have changed, was such that the ratio of contact closing period to opening period of the regulator contacts also assumed a new value. The regulator may be operating, then, very close to one of the limiting values of its operating range, so that comparatively small additional change of speed will be sufficient to throw the regulator out of its stable regulating range of operation.

This is especially true in the case of abrupt speed changes which may cause great trouble with regard to the stability of the motor and the reliability of operation. Only highly skilled personnel and continuous and accurate supervision will assure reliability of operation. In practice, especially in wireless plants, the variations of load are very large, e. g., when keying a wireless transmitter supplied by a high frequency alternator, or when using supply voltages from a network subject to great load variations.

The regulating system according to this invention automatically adjusts the regulating device to the most favorable point of operation, i. e., in the middle of its regulating range in accordance with varying conditions so that a falling out of the stable range of regulation is readily prevented. According to the invention a means is provided to shift the regulating range in accordance with variations of load or the supply energy of the motor automatically, in such a way that the regulator always remains within the stable range of operation at a most favorable operating point. This means may be directly influenced by the speed or may be indirectly influenced by the regulator itself, as is shown in the remaining figures illustrating the practical embodiments of this invention.

Referring once more to Fig. 1, after the time $t_s$, it is supposed that the variable regulating resistance inserted in the shunt circuit of the motor has been decreased. In this case, it will be seen that the current in the shunt circuit will then increase and decrease according to the curves $a'$ and $b'$ respectively corresponding to a larger final value $a'_e$ of the exciting current. It is seen that by a proper variation of the regulating resistance equal contact opening and closing periods may be secured again, as shown after the time $t_s$. Thus, the regulator will work again at its most favorable point of operation. The adjustment of the resistance in the shunt circuit has to be made in accordance with the displacement of the operating point from the normal value, i. e., in accordance with changes of the value of the ratio of contact closing period to contact opening period.

Referring to Fig. 2, numeral 1 represents a machine whose speed of rotation is to be maintained at a constant value. It may be, e. g., a high frequency alternator of a wireless plant. Numeral 2 is a prime mover for driving the machine 1, in the example shown a shunt-wound direct current motor which is supplied by the direct current mains 3. Numeral 4 is the exciting winding of the motor, 5 is a regulating resistance for the vibrating regulator, and 6 is a variable rotary resistance provided in accordance with the present invention and intended for adjusting to the most favorable regulating conditions, as will be described below.

Numeral 7 is a disc mounted on a common shaft with the motor 2 and rotating in a vertical plane. The elements forming the vibrating regulator are mounted on this disc, but they may also be directly arranged on the rotor of the high frequency machine 1 itself. The regulator proper comprises a spring 8, fixed at one side on the disc 7 and carrying on its free end a contact weight 9. Opposite this contact weight, a contact 10 is fixed on the disc. Electrical leads connect the spring 8 and contact 10 to slip rings 11, which are connected by means of brushes to the terminals of the regulating resistance 5 in the shunt circuit of the motor 2. The spring 8 and the contact weight 9 are so designed that a contact takes place between 9 and 10 once during each revolution of the disc 7, viz., when the spring is in its lower position. In this case, the centrifugal force and the gravity force act together on the weight 9 both in the same direction, causing the contacts 9 and 10 to be closed for a shorter or longer period, depending on the value of the centrifugal force and consequently on the speed of rotation of the prime mover 2.

Thus, the resistance 5 is periodically opened and short-circuited whereby a regulating action of the speed of rotation of the motor 2, takes place, as above described. The contacts 9 and 10 are further connected by means of the slip-rings 11 to the winding 12 of a relay parallel to the resistance 5. The relay winding is periodically opened and short-circuited by the contacts 9 and 10 and accordingly causes current from the exciting winding to flow periodically through the relay winding. A local battery may also be inserted into the circuit of the relay winding 12. Numeral 13 is an armature for the relay which alternately closes contacts 14 and 15 respectively in accordance with the operation of the contacts 9 and 10. Contacts 14 and 15 are connected to the terminals of a potentiometer resistance 16 connected to the supply source 3 of a servo-motor 17. The motor 17, in the case shown, is a shunt-wound motor having its armature terminals connected to the middle point of resistance 16 and to the armature 13 respectively. The exciting winding 18 of the servo-motor is connected to the direct current supply mains 3. The motor 17 is coupled mechanically to vary the resistance 6 in the shunt circuit of the motor 2.

The operation of this device is as follows:—

The contacts 14 and 15 will be closed alternately in accordance with the operation of the regulator contacts 9 and 10, whereby means of the potentiometer resistance 16 a positive and a negative voltage will alternately be applied to the armature of the servo-motor 17. The motor 17, thus, has a tendency to alternately start in one or the other direction.

In case the closing and opening periods of the regulator contacts are equal, i. e., that the regulator works in its most favorable condition, the contacts 14 and 15 will also be closed during equal periods and accordingly the motor 17 will be connected during equal periods to opposite supply voltages. Its tendency to start in one direction is therefore balanced by a tendency to start in the other direction. The motor 17 will, therefore, stand still and will only vibrate slightly about its zero position.

Whenever the speed of motor 2 changes due to a change in the load or due to variations of the supply voltage of the mains 3, the opening and closing periods of the regulator contacts 9 and 10 will no longer be equal, which results in the shifting of the regulating conditions away from their most favorable value, as explained above, and as shown after time $t_2$ according to Fig. 1. Thus, also, the closing periods of the contacts 14 and 15 will no longer be equal, with a result that the tendency of the motor 17 to start in one direction predominates over the tendency to start in the opposite direction. The servo-motor 17 will therefore start in one direction and change the resistance 6 until the regulation again works at a point at which opening periods and closing periods of the regulator contacts have become equal. The servo-motor will then stop again automatically, as will be readily understood (see time $t_3$ according to Fig. 1).

The regulating resistances 5 and 6 of which one is for the vibrating regulation and the other is operated by the rough regulation, may be inserted in any electrical circuit adapted for influencing the speed of rotation of the prime mover to be maintained at a constant speed. Such a regulating electric circuit may, e. g., be the exciting circuit of an eddy current brake associated with the prime mover and adapted to influence its speed of rotation. In this case, the prime mover may be of any type and need not necessarily be an electric motor.

According to the specific embodiment of the invention, as presented by Fig. 2, the same regulator is used for the vibrating and the rough regulation. This constitutes a very simple and practical regulation system. In the case, however, where the power of the prime mover to be regulated is very large, this arrangement presents certain disadvantages in that the magnitude of the current to be carried by the regulator contacts becomes very large.

It will then no longer be advisable to use the same regulator for both regulations, since they require currents of very different strength. Moreover, the energy required for regulation of the prime mover is so large that it is advisable to use a separate exciter dynamo to supply the exciting windings of this prime mover and the regulation is then applied to the field of this exciter rather than to the main exciting winding. Since this field is relatively smaller, the energy handled by the contacts or the associated apparatus is also much smaller. Even this energy, however, may be too large. The contacts of the regulator can only carry small currents in order to secure reliable operating conditions. According to another feature of this invention, there is provided an independent control circuit of relatively small power directly influenced by the regulator contacts. This circuit contains further means such as relays adapted to act on the regulation mechanism of both regulating arrangements employed. In this manner one regulating device only will be necessary.

Figure 5:
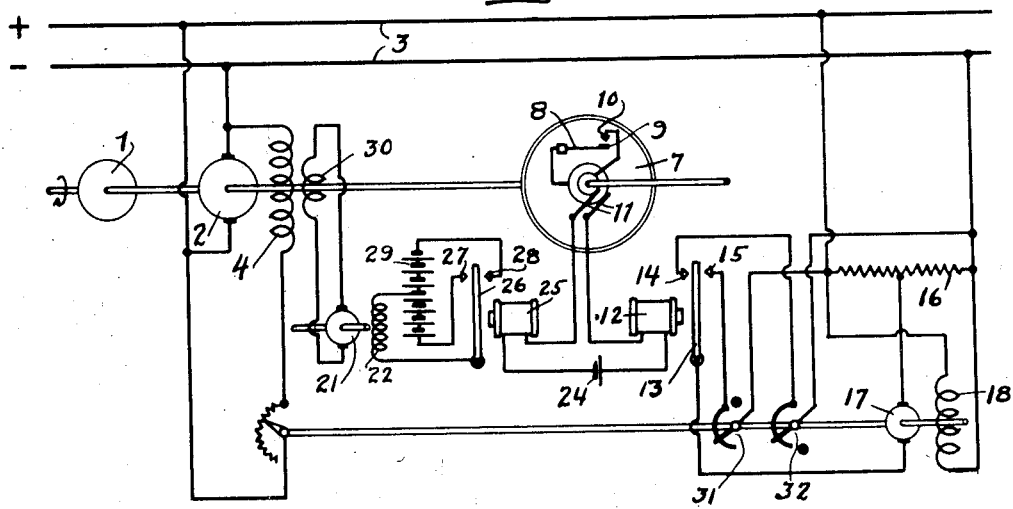
Fig. 5 is a further modification of Figs. 3 and 4 in which a separate exciting circuit is supplied and also protective means for extreme regulating conditions.

Referring to Figs. 3–5, some practical examples are shown for carrying out this latter feature of the invention. In all of the figures 3–5, numeral 21 is a regulating dynamo intended to provide an additional exciting field periodically imposed or withdrawn from the main field of the motor 4; 22 is the exciter winding of this dynamo and 24 is a battery for supplying a control current of small magnitude to be directly influenced by the regulator contacts 9 and 10.

Referring more particularly to Fig. 3, the regulator controls a circuit of small power containing the relay winding 12 for the rough regulation, battery 24 and a regulating resistance 23 included furthermore in the shunt circuit of the regulating dynamo 21.

Referring to Fig. 4, the regulator control circuit contains a further relay in place of the resistance 23, according to Fig. 3. This relay has a winding 25 and an armature 26 in a similar manner, as is the case with the relay 12, 13. Numeral 29 is a separate source of exciting current for the dynamo 21; in the case shown, a battery which has its terminals connected to the contacts 27 and 28 respectively. The terminals of the exciter winding 22 of the dynamo 21 are connected to the armature 26 of the relay and the midpoint of the battery 29 respectively. This connection possesses the special advantage that the battery 24 may be made very small, e. g., of a few volts only, independent of the power of the prime mover 2. Thus, a very precise and reliable operation of the regulator is secured, and sparks and electric arcs established between the contacts are avoided.

Referring to Fig. 5, an arrangement adapted for regulating machines of very high power is shown. For this purpose, a special exciter winding 30 for the motor 2 is provided, besides the main exciter winding 4. The winding 30 may be designed independently of the exciter winding 4, and may be given its proper dimension with respect to the regulating dynamo 21.

In order to prevent the servo-motor from exceeding the two limiting positions of the regulating resistance which it controls, a means is provided, according to a further feature of this invention, to stop the motor at these limiting positions; such means are shown, e. g., in Fig. 5, in which similar reference numbers refer to similar elements as those of Fig. 2. Numerals 31 and 32 are two contact rails swept over by contact arms moved by the servo-motor 17. These contact rails and contact arms are each inserted in one of the motor armature circuits in such a way as to interrupt this circuit in the limiting position and thus stop the motor.

In case of large machines where a servo-motor would be impractical to adjust the variable resistance, a dynamo similar to 21 may replace this resistance. In that case the servo-motor would control a variable resistance in the field of such a dynamo.

Having described my invention, what I believe to be new and desire to secure and protect by Letters Patent of the United States is:—

1. A system for keeping constant the speed of an electric machine with a speed influencing circuit, a regulating resistance inserted in said circuit, a vibrating regulating device periodically short-circuiting said resistance to maintain the speed constant within a certain operating range of load variations of said machine, a further variable resistance inserted in said circuit, a servo-motor controlling said further resistance, a source of supply voltage for said servo-motor, and means to reverse periodically the polarity of said source in accordance with the vibrating action of said regulating device.

2. A system for keeping constant the speed of a shunt wound electric motor, a regulating resistance inserted in the shunt circuit of said motor, a vibrating regulating device periodically short-circuiting said regulating resistance to maintain the speed of said motor constant within a certain range of load variations of said motor, a further variable resistance inserted in said circuit, a servo-motor controlling said further resistance, a source of supply voltage for said servo-motor, and means to reverse periodically the polarity of said source in accordance with the vibrating action of said regulating device.

3. In a system for keeping constant the speed of rotation of an electric motor comprising an exciting circuit for said motor, an electric resistance inserted in said exciting circuit, a speed regulating device periodically short-circuiting said resistance to impose on and withdraw an additional exciting current for said motor, the ratio of the period of imposing said additional current to the period of withdrawing it being dependent on the speed, and means governed by said speed regulating device in accordance with speed variations for changing the mean current in said exciting circuit in such a manner that the periods of imposing and withdrawing said additional current are approximately alike for all conditions of load of said motor.

4. A speed regulator system for a shunt wound electric motor, an electric circuit, a vibration regulator for periodically closing and opening said circuit at intervals dependent on speed, means operated by said circuit to periodically influence the exciting shunt current for said motor to maintain constant its speed within a certain range, a rough regulating resistance in the field circuit of said motor, further means also controlled by said circuit to vary said regulating resistance to adjust the mean value of the current in said shunt circuit to shift said operating range to keep said regulator working within a large range of variation of load of said motor.

5. A system of speed regulation as in claim 2, and means associated with said servo-motor to disconnect it from said source when the extreme settings of said variable resistance are reached.

6. In a system for maintaining the speed of rotation of a machine constant comprising a vibrating speed regulator associated with said machine having contacts periodically operated with a ratio of opening to closing periods in accordance with the speed of said machine, a speed regulating circuit for said machine controlled by the periodic operation of said contacts, whereby the speed of the machine is maintained constant within a certain operating range of load variations, and means also dependent on the speed of said machine to shift said operating range to keep said regulator in operation within a large range of load variations of said machine.

7. In a system for maintaining the speed of rotation of an electric motor constant comprising a speed regulating circuit for said motor, a variable resistance in said circuit for maintaining a mean value of current therein, a vibrating speed regulator for said motor having contacts periodically operated with a ratio of opening to closing periods in accordance with the speed of said motor, a regulating resistance connected in said circuit and alternately cut in and out of said circuit by said contacts, whereby the speed of said machine is maintained constant within a certain range of load variations of said motor, and means also dependent on the speed of said motor to control said variable resistance to adjust the mean value of the current in said circuit to keep said regulator in operation within a large range of load variations of said motor.

8. In a system for maintaining the speed of rotation of an electric motor constant comprising a speed regulating circuit for said motor, a variable resistance in said circuit for maintaining a mean value of current therein, a vibrating speed regulator for said motor having contacts periodically operated with a ratio of opening to closing periods in accordance with the speed of said motor, a regulating resistance connected in said circuit and alternately cut in and out of said circuit by said contacts, whereby the speed of said machine is maintained constant within a certain range of load variations of said motor, and a servo-motor controlled by said regulator and adapted to adjust said variable resistance to vary the mean value of the current in said circuit to keep said regulator in operation within a large range of load variations.

9. In a system for maintaining the speed of rotation of an electric motor constant comprising a speed regulating circuit for said motor, a variable resistance in said circuit for maintaining a mean value of current therein, a vibrating speed regulator for said motor having contacts periodically operated with a ratio of opening to closing periods in accordance with the speed of said motor, a regulating resistance connected in said circuit and alternately cut in and out of said circuit by said contacts, whereby the speed of said machine is maintained constant within a certain range of load variations of said motor, a servo motor to control said variable resistance, a current supply source for said servo motor and means associated with said regulating contacts to periodically reverse the polarity of said source in respect to said servo motor in accordance with the opening and closing periods of said regulator contacts.

10. In a system for keeping constant the speed of rotation of a machine comprising a speed regulating circuit for said machine, a vibrating speed regulator having contacts included in said circuit and resiliently mounted in respect to each other on said machine in a vertical position whereby said contacts are subjected to the action of centrifugal force and to periodic reversals of gravity to control the ratio of opening to closing of said contacts in accordance with the speed of the machine, a regulating resistance connected in said circuit and controlled by said contacts whereby the speed of the machine is maintained constant with in a certain operating range of load variations, and means also dependent on the speed of said machine to shift said operating range to keep said regulator in operation within a large range of load variations of said machine.

11. In a speed regulating system for an electrical machine, a speed regulating circuit for said machine, a variable resistance in said circuit to adjust the mean current flow therein, a regulating device for periodically increasing and decreasing the current in said circuit above and below said mean value, said regulating device being responsive to the speed of the machine whereby the ratio of a period of increased current to a period of decreased current depends on the speed of the machine and an additional means controlled in accordance with the said ratio for controlling said variable resistance to maintain said ratio substantially equal to 1 under all conditions of operation.

12. In a speed regulating system for an electrical machine, a speed regulating circuit associated with said machine, means for varying the mean value of the current in said circuit, means responsive to the speed of said machine for alternately varying the current in said circuit above and below the mean value and means controlled by said last mentioned means for adjusting said first mentioned means to maintain the ratio of a period of increased current to a period of decreased current substantially equal to 1.

13. In a regulating system, comprising means for periodically imposing on and withdrawing a regulating action from a magnitude to be maintained constant at a normal value, means responsive to deviations of said magnitude from said normal value for varying the ratio of a period of imposed regulating action to a period of withdrawn regulating action, and further means responsive to said last mentioned means for adjusting said first means to maintain said ratio substantially equal to one.

14. In a speed regulating system, a prime mover, means for periodically imposing on and withdrawing a regulating load from said prime mover, means to vary the ratio of a period of imposed regulating load to a period of withdrawn regulating load in accordance with the deviations of the speed of said prime mover from a desired normal value and further means responsive to said last means to maintain said ratio of imposing and withdrawing periods substantially equal to one.

In testimony whereof I have affixed my signature.

ROBERT HERZOG.